United States Patent [19]

Morling et al.

[11] 4,072,062
[45] Feb. 7, 1978

[54] SELF-CLEANING SPROCKET

[75] Inventors: Roy W. Morling, Elmhurst; Robert J. Mackert; Elmer M. Kesl, both of Downers Grove, all of Ill.

[73] Assignee: International Harvester Company, Chicago, Ill.

[21] Appl. No.: 754,711

[22] Filed: Dec. 27, 1976

[51] Int. Cl.² .................... F16H 55/30; F16H 7/00
[52] U.S. Cl. .................................. 74/243 R; 74/229
[58] Field of Search ............... 74/216.5, 230, 243 R, 74/229

[56] References Cited

U.S. PATENT DOCUMENTS

| | | | |
|---|---|---|---|
| 3,083,583 | 4/1963 | Szonn | 74/229 |
| 3,472,563 | 10/1969 | Irgens | 74/229 X |

*Primary Examiner*—Leonard H. Gerin
*Attorney, Agent, or Firm*—Dennis K. Sullivan; Floyd B. Harman

[57] ABSTRACT

A self-cleaning sprocket, especially for use with an endless belt having internal drive lugs in a crop gathering unit, being a body of material having a disk-like base portion and a plurality of radial ribs extending axially from the base portion and converging to a central hub portion, the ribs and base center portion defining a plurality of open-ended lug-receiving pockets. The portion of the base portion in the pockets slopes axially toward the open end from the periphery to the hub portion and the hub portion slopes radially inwardly from the base portion to the open end, the intersection of the hub and base portions being filletted to promote the flow of debris from the base portion to the hub portion. The axial end of the sprocket is preferably flat and without obstructions and extends beyond the lateral edge of the belt. The sprocket is preferably mounted with the pockets in a generally upright position from its opposite axial end whereat a second plurality of pockets are formed. Preferably, the circumferential pitch of the pockets is slightly greater than that of the lugs and the pockets are wider than the lugs to induce a sideward cleaning action.

23 Claims, 4 Drawing Figures

U.S. Patent    Feb. 7, 1978    Sheet 1 of 2    4,072,062
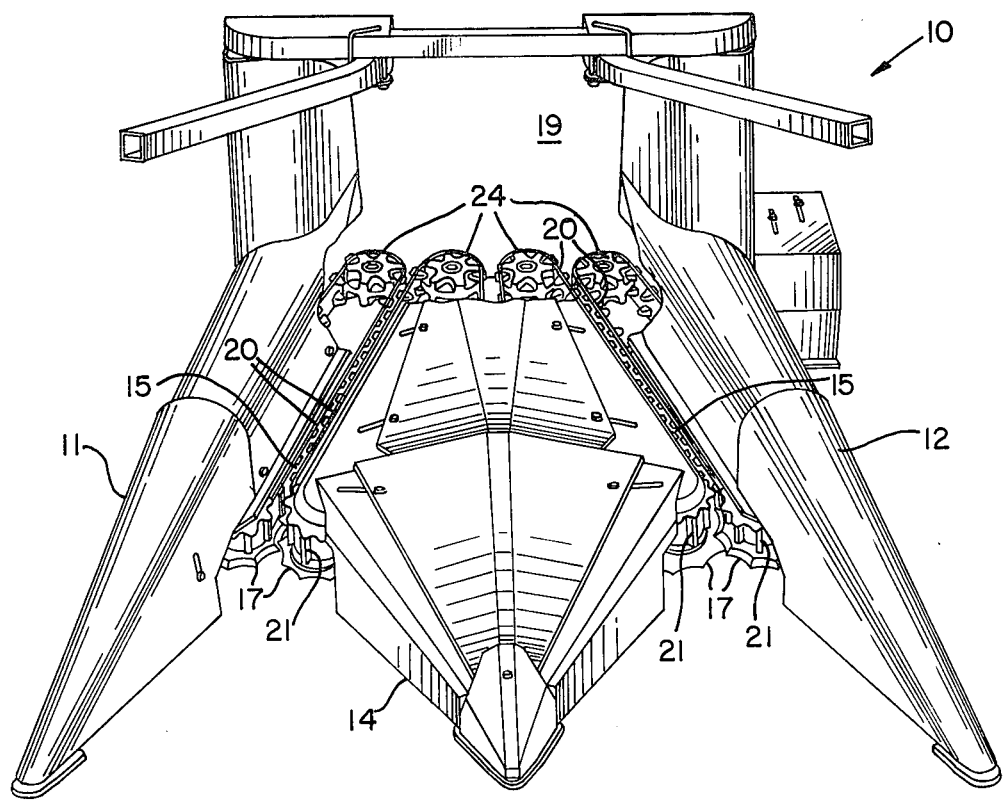
FIG-1-
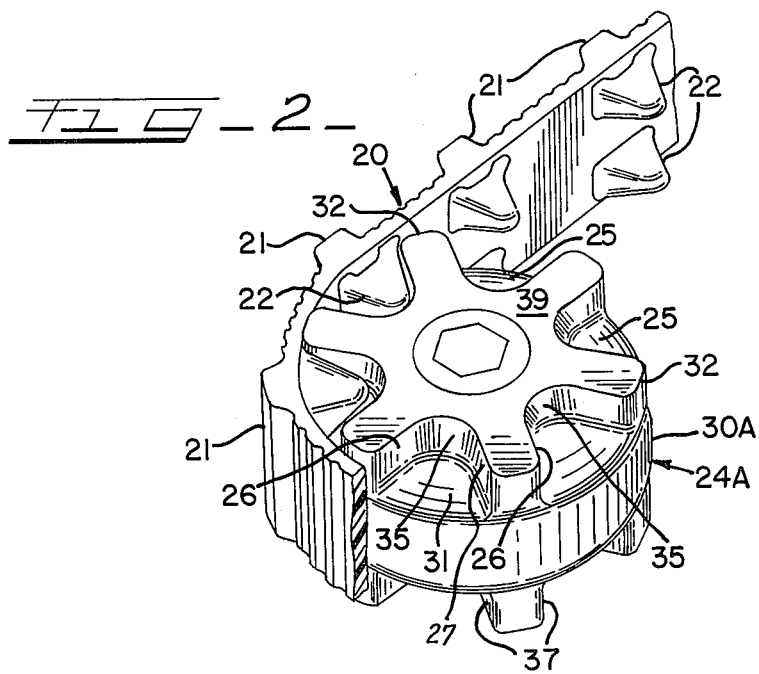
FIG-2-

SELF-CLEANING SPROCKET

CROSS-REFERENCE TO RELATED APPLICATION

This application is related to application Ser. No. 690,813, filed May 27, 1976, by Edward A. Fritz and Peter Sammarco, and assigned to the assignee hereof.

BACKGROUND OF THE INVENTION AND THE PRIOR ART

This invention relates to sprockets used with an endless belt of the type having internal drive lugs and, more particularly, to a self-cleaning sprocket for use with a crop gathering belt in a forage harvester row crop gathering unit.

The use of endless crop gathering belts having internal drive lugs in a forage harvester gathering unit is well known. Examples of this can be found in U.S. Pat. Nos. 3,853,016, 3,854,272, 3,888,132, and 3,940,913. Cage-like, tang, or flanged sprockets are utilized in these references.

A problem which occurs with the use of these belts and sprockets in crop gathering is that crop debris in the form of small pieces of crop can accumulate behind the belts on or in the sprockets. Debris in longer pieces can become wrapped around the sprocket or its mounting spindle. In either case, a sufficient accumulation of debris can throw the belts off the sprocket, especially driving sprockets, or at least lift the belt far enough from its driving sprocket to cause the sprocket to slip beneath the belt, defeating its purpose. Such a debris accumulation could also stretch the belt thus shortening its life or, indeed, break it. Wrapping of crops on the sprocket or spindle tends to feed upon itself and adversely affect bearing life. In extreme cases, the flow of crop through the gathering passages could be obstructed.

In U.S. Pat. No. 3,472,563 a self-cleaning belt and sprocket are taught for use on snowmobiles. The sprocket is similar in some respects to that taught herein. A major exception is that the belt lug pockets formed by the sprocket teeth have no bottoms which extend to the center hub producing a cage-like structure. Our experience in removing crop debris, especially moist and sticky debris or mud, from belt sprockets indicates that the debris must be forced out of the pocket. Without a complete pocket, including a bottom which closely fits the belt lug, this type of crop debris is not easily expelled. In U.S. Pat. No. 3,948,110 complete pockets are provided. However, the inner portion of the pocket and bottom portion meet at nearly right angles creating a corner. Drier debris can become lodged or wedged in this area and moist material would stick in the corner and build an accumulation.

Another aspect of cleaning sprockets is providing a side to side cleaning action by having the pitch of the tangs exceed slightly the pitch of the belt as will be explained below. Sprockets of the type shown in U.S. Pat. No. 3,853,016 have been so designed. However, if the pocket bottom does not closely fit the belt lug, debris cleaning action can be lost.

SUMMARY OF THE INVENTION

Accordingly, it is the major object of the invention described and claimed herein to provide a self-cleaning sprocket for use with an endless belt having internal drive lugs wherein debris accumulating in the lug pockets of the sprocket may be easily removed therefrom primarily by the action of the lug in the pocket.

It is further an object of the invention to provide a sprocket and belt combination wherein wrapping of crops about the sprocket or its mounting spindle is minimized.

These and other objects of the invention are specifically met in a self-cleaning sprocket for use with an endless gathering belt having internal drive lugs wherein the sprocket comprises a body of material having a disk-like base portion and a plurality of radial ribs extending axially from the base portion and converging to a hub portion, thereby forming a plurality of circumferentially-spaced, lug-receiving pockets axially adjacent the base portion, the pockets having open axial ends. The base portion slopes toward the open axial end from the periphery of the base portion toward the hub portion and the hub portion slopes radially inwardly from the base portion to the open axial end, the intersection between the hub portion and base portion being filletted to facilitate the flow of debris from said base portion to said hub portion. The axial end of the sprocket is preferably flat and without obstructions to prevent wrapping. In the preferred embodiment, the aforementioned pockets comprise the upper set of pockets for a double lugged belt and a second set of pockets extends downwardly from the base portion to accommodate the lower belt lugs and are of similar shape except that the sloped hub portion of the pockets is unnecessary. In the preferred embodiment, the sprocket would be mounted to its associated structure from beneath the sprocket.

In a further aspect of the invention, the pitch of the lug pockets is slightly greater than the root pitch of the belt lugs and the pockets are of considerably larger size circumferentially than the belt lugs while the pocket bottoms closely fit the belt lugs. This produces a change of circumferential position of the belt lug in the pocket with each succeeding rotation of the sprocket when the belt is under no load or light loads. Under normal loads, the lugs move back in the pockets to be driven by the ribs causing a sideward cleaning action. Since this action, as well as the axial expulsion action described herein, which is apparently more effective on moist and sticky debris, are both desirable, the preferred embodiment includes these latter features. However, if the sideward cleaning action were not desired, the lug pockets would be only slightly larger than the belt lugs to enhance the axial expulsion action.

DETAILED DESCRIPTION OF THE DRAWINGS

Other objects and advantages of the invention will become apparent upon reference to the detailed description of the invention and to the drawings, in which:

FIG. 1 is a pictorial view of a row crop gathering unit incorporating the invention, portions of the surrounding sheet metal being removed for clarity;

FIG. 2 is a pictorial view of a portion of an endless belt entrained on one embodiment of a sprocket in accordance with the invention;

DETAILED DESCRIPTION OF THE INVENTION

Figure 3:
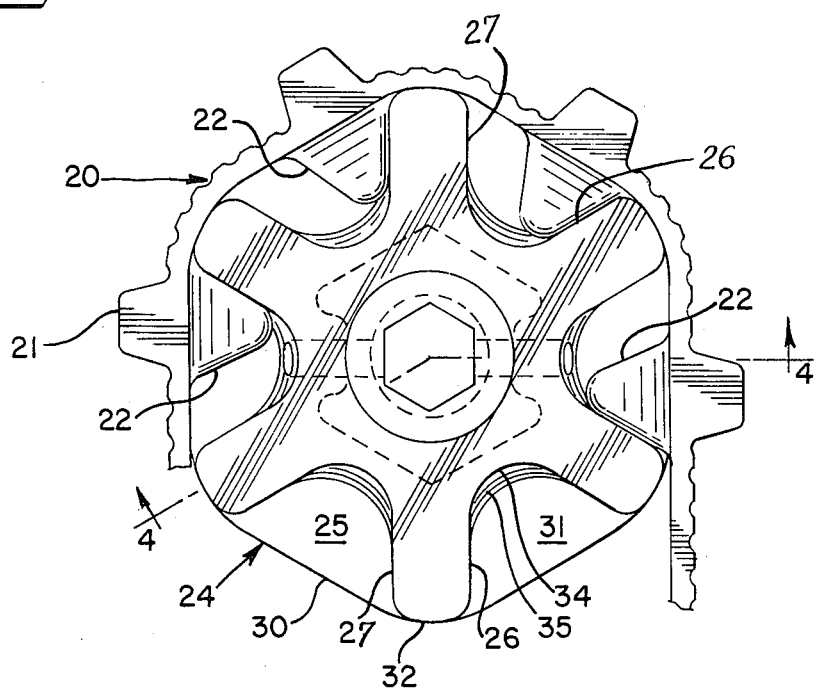
FIG. 3 is a top view of an endless belt and a second embodiment of the sprocket in accordance with the invention; and, FIG. 4 is a sectional view of the belt and sprocket of FIG. 3 taken along the line 4—4 thereof.

Turning to FIG. 1, there is shown a row crop gathering unit, generally designated 10, of the type described in detail in the aformentioned copending application Ser. No. 690,813, which is incorporated by reference herein. For purposes of the present invention, the row crop unit 10 is adapted to be mounted to the basic processing unit (not shown) of a forage harvester and comprises left and right outer dividers 11 and 12 which together with the center divider 14 define a pair of crop gathering passageways 15. A crop cutting means in the form of a pair of cooperating rotary knives 17 is located at the forward end of each of the passageways 15. The passageways converge rearwardly to an open feed throat 19 whereat the crop stalks are transferred to the forage harvester (not shown). To move the crop stalks through the passageways 15 after cutting, a pair of rearwardly moving elastomeric endless belts 20 are disposed along the sides of the passageways 15, the belts 20 having external lugs 21 which aid the gripping of the stalk butts between the belts 20.

The belts are further provided with generally pyramidal-shaped internal drive lugs 22 in a pair of equally longitudinally spaced rows of a given pitch, the lugs of one row being in lateral alignment with the lugs of the other row. Each of the belts 20 is entrained about a generally vertically oriented driving sprocket 24 located adjacent the rear ends of the crop passageways 15, the internal drive lugs 22 entering upper lug pockets 25 and lower lug pockets 37 in the sprockets 24 as will hereinafter be seen. The forward end of the belts 20 are entrained on forward sprockets (not shown) mounted on the rotational axes of the rotary knives 17 and transmit power thereto, suitable means, such as shown in the copending application, maintaining the belts in tension.

Figure 4:
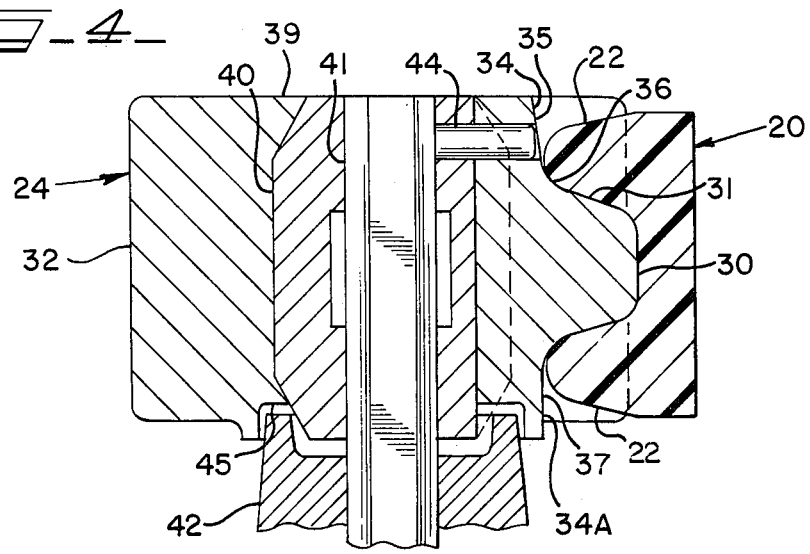

Referring now to FIGS. 2, 3, and 4, it will be observed that the only difference between the sprocket 24A of FIG. 2 and the sprocket 24 of FIG. 3 is in the configuration of the outer periphery. Both sprockets are formed from a body material, such as high density, polyethylene, and have a disk-like center or base portion 30, 30A having a generally cylindrical outer periphery. In the case of the sprocket 24A of FIG. 2, the cylindrical outer periphery of the base portion 30A is circular. In the case of the sprocket 24, the cylindrical outer periphery of the base portion 30 is more hexagonal, being formed by chordal lines across the openings of the six pockets 25 therein. The latter sprocket form is preferred since it apparently increases belt life.

The sprocket 24 further comprises a plurality of equally spaced ribs 32, preferably six in number, extending axially upwardly from the center or base portion 30, the ribs 32 extending radially inwardly from the outer periphery of the base portion 30 and converging to form a hub portion 34 by the blending of a relatively large radius between the ribs. The diameter of the outer periphery of the base portion 30 is sized such that, in operation, the circumferential spacing or pitch of the ribs 32 will be slightly greater than the pitch between the bases of the lugs 22 on the belt 20. The ribs 32, hub portion 34, and base portion 30 thus define the lug receiving pockets 25 of the sprocket 24, the axial or upper ends of the pockets 25 being open.

The side faces 26 of the pockets 25, which drivingly engage the internal lugs 22 of the belt 20, lie in a plane parallel to a radial plane bisecting the adjacent rib 32, the nondriving side faces 27 being on the opposite sides of the ribs 32 from the driving side faces 26. The thickness of the ribs 32 combined with the orientation of the side faces should produce the same angle of the side faces 26 relative to the axis of the sprocket as the face of the drive lug 22 which may engage it. By proper sizing and a limited number of ribs, this should also produce the result that the pockets 25 are considerably larger than the belt lugs 22 and have relatively large subtended angles, on the order of 60°, as shown in FIG. 3. The bottom face 31 of the pocket 25 formed by the base portion 30 lies in a plane sloping upwardly, preferably at an angle of about 10°, coinciding with the angle of the face of the belt lug 22 which engages it, from the periphery of the base portion 30 to its intersection with the hub portion 34. The hub portion 34, forming the radially inner face 35 of the pocket 25, slopes radially inwardly, preferably at an angle of about 10°, from its intersection with the base portion 30 to its upper axial end. The obtuse angle thus formed between the base portion and hub portion and the relatively large subtended angle of the pockets also prevents drier materials from lodging in the inner portion of the pocket. The intersection between the base portion 30 and hub portion 34 is generously filletted as at 36 to permit material flow from the bottom face 31 of the pocket 25 to the inner face 35 thereof.

Thus, when debris, especially moist and sticky debris, is present in a pocket 25, the action of the belt lug 22 entering the pocket will cause debris laying on the bottom face 31 to be pushed inwardly toward the center and, as more material is added, to move around the fillet 36 and up on the inner face 35 or hub portion 34 of the pocket 25 and ultimately out the open axial end of the pocket. It can be seen that the coincidence of angles between the bottom face 31 of the pocket 25 and the belt lug face and the obtuse angle between the hub 34 or inner face 35 and the base portion 30 or bottom face 31 aids this action. Similarly the close fit and angular coicidence between the driving side face 26 of the pocket 25 and that of the belt lug 22 will tend to move material from this area which will also be pushed toward the hub portion 35 and upwardly thereon.

As mentioned above, the pitch or circumferential distance between the ribs 32 or lug-driving side faces 26 is designed to be slightly greater, on the order of about 0.020 inch, or about 1% of the pitch, than the pitch of the belt lugs 22 along the line of contact of the belt 20 with the sprocket 24, that is, at the bases of the lugs 22. The lug pockets 25 are of considerably large size circumferentially than the lugs as shown in FIG. 3. When the belt 20 is operated under no load or light crop loads, the belt is driven by the frictional engagement of the portion between the rows of lugs with the outer periphery of the base portion 30 of the sprocket 24. Since the slight difference in pitch between the belt and sprocket creates an out of phase condition which is accumulative, as each pocket rotates to receive a belt lug, the position of the lug relative to the pocket will be further away from the lug driving side face 26 until it nears the face 27 on the other side of the pocket whereat it will tend to remain unless a load is imposed on the belt. As a sufficient amount of load is applied to the belt, as by crops being cut and moved through the passageway 15, the frictional dirving of the belt is overcome and the lug slides back in the pocket toward the driving side face 26, the belt stretching a little to overcome the slight difference in pitch, and the belt is then driven by the side faces 26 of the sprocket acting through the lugs 22. This produces the result that, as the loading on the belt fluctuates, the lug moves back and forth in the pocket and, since the bottom face 31 of the pocket fits the lug surface relatively closely, dislodges debris which can be thrown off the sprocket by centrifugal force.

It will be appreciated that although the sprocket 24 has been described as having specific portions, the sprocket is in fact one body of molded material and that the hub portion is formed by a blend radius between the ribs 32. The intersections of the side faces 26, 27 and the bottom and inner faces 31, 35 of the pockets 25 are filletted to prevent material from catching in the corners.

As indicated, the foregoing discussion has concerned itself with the set of pockets 25 located above the base portion 30. As will be seen from FIG. 4, a lower set of pockets 37 are formed below the center or base portion 30 by the extension of the ribs 32 and hub portion 34 therethrough. These pockets are the same as the upper pockets except that the radially inward slope of the hub portion 34A is not necessary since debris pushed inwardly in the lower pockets 37 by the belt lugs will fall out by gravity. It is also noted that the axial thickness of the base portion 30 should be sized to produce a relatively close fit between the base portion and the upper and lower lugs 22 of the belt 20. This aids proper belt tracking as well as the removal of debris.

The top surface 39 of the sprocket 24 is perpendicular to the sprocket axis and ends beyond the lateral edge of the belt 20 so that the debris forced upwardly out of the pockets by the lugs 22 will be thrown off the sprocket. The top surface 39 further is flat and without obstructions to prevent wrapping of longer material thereabout. To accomplish this, the sprocket 24 is provided with a metal core 40 having a hexagonal shaft 41 which extends from a location flush with the top face 39 of the sprocket and out the bottom face thereof to a rotational mounting (not illustrated) in a casting, a portion of which is shown at 42, mounted on the frame of the row crop unit 10. The sprocket 24 is retained on the hexagonal shaft 41 by a roll pin 44 extending therethrough. It will observed from FIG. 4 that the lower end of the hub portion 34 is provided with an annular recess 45 to receive the end of the casting 42, thereby preventing wrapping of crops around the rotating hexagonal shaft 41. The details related to driving the sprocket 24 are beyond the scope of this invention, but may be found in the referenced copending application.

Thus it is apparent that there is provided, in accordance with the invention, a self-cleaning sprocket especially for use with harvester gathering belts that fully satisfies the objects, aims, and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

What is claimed is:

1. A self-cleaning sprocket for use with an endless belt having internal lugs for engaging the sprocket comprising a body of material having a disk-like base portion having an outer periphery, a plurality of radial circumferentially spaced ribs extending axially from said base portion, said ribs converging to a center hub and defining, with said base portion, a plurality of lug receiving pockets therebetween having open axial ends opposite said base portion, the surface of said base portion in said pockets sloping toward said open ends from said periphery to said hub and the surface of said hub in said pocket sloping radially inwardly from the base portion toward said open axial ends, the intersection of said base portion and said hub portion being filletted such that the flow of debris from said base portion surface to said hub surface is facilitated.

2. The invention in accordance with claim 1 and a second set of radially circumferentially spaced ribs extending axially from said base portion in the opposite direction from said plurality of ribs, said second set of ribs converging to a center hub and defining with said base portion a second set of lug receiving pockets having open axial ends opposite the base portion, the surface of said base portion in said second set of pockets sloping toward said open ends from the outer periphery to the hub portion.

3. The invention in accordance with claim 2 and means for rotationally mounting said sprocket on an associated structure, said mounting means extending to said sprocket on the end thereof having said second set of pockets.

4. The invention in accordance with claim 1 and the axial end face of said plurality of ribs and hub portion being flat and without obstructions.

5. The invention in accordance with claim 1 and said sprocket being in combination with said endless belt, the angle of said base portion corresponding to the angle of the belt lug surface adjacent said base portion such that the belt lugs push debris inwardly along the bottom faces of said pockets upon said lug entering said pockets.

6. The invention in accordance with claim 1 and said pockets being substantially larger circumferentially of said sprocket than said belt lugs and the designed pitch of said pockets being slightly greater than the designed pitch of said belt lugs along the line of engagement of said belt and said sprocket such that, upon said belt being lightly loaded, said belt is driven by frictional engagement with the outer periphery of said sprocket, the position of said lugs in said pockets varying, and, upon said belt being sufficiently loaded to overcome said frictional engagement, the lugs slide backward in said pockets and said belt is driven by engagement of said ribs and said belt lugs.

7. The invention in accordance with claim 6 and said pocket pitch exceeding said belt lug pitch by about 1% of the pitch of the belt lugs.

8. A self-cleaning sprocket for use with an endless belt having internal lugs for engaging said sprocket, comprising a body of material having a generally cylindrical outer periphery, said sprocket having a generally cylindrical central base portion and a plurality of circumferentially spaced lug receiving pockets above and below said central portion, said upper lug pockets being open to the axial end of the sprocket and having a bottom face sloping upwardly inwardly from its intersection with said outer periphery, a generally axial lug engaging side face intersecting said bottom face and parallel to a radial line within the portion of the sprocket between said side face and the next adjacent pocket, and a radially inner face intersecting the side and bottom faces and sloping radially inwardly from the bottom face toward the upper end of the sprocket, the intersections between said faces being filletted to round the corners thereof.

9. The invention in accordance with claim 8 and said upper pockets having an axial side face opposite said lug engaging side face intersecting said inner and bottom faces, both of said side faces being parallel to radial lines bisecting the rib portion of the sprocket between the side face and the side face of the next adjacent pocket.

10. The invention in accordance with claim 9 and the top surface of said sprocket being flat and without obstructions.

11. The invention in accordance with claim 10 and said sprocket being in combination with said belt, the upper end of said sprocket extending beyond said belt.

12. The invention in accordance with claim 8 and said lower circumferentially spaced lug pockets comprising an upper face sloping downwardly inwardly from said outer periphery, generally axially side faces parallel to radial lines bisecting the rear portions of said sprocket between adjacent pockets, a radially inner face intersecting said side and top faces, said intersections being filletted to remove the corners thereat, and an open bottom face.

13. The invention in accordance with claim 9 and said sprocket being adapted for rotational mounting on an associated structure, the means for so mounting said sprocket extending through the lower end of said sprocket.

14. The invention in accordance with claim 8 and said generally cylindrical outer periphery comprising chordal flat portions across the pocket entrances.

15. In a crop gathering unit of the type having at least one crop passageway and an endless gathering belt having internal lugs running adjacent said passageway, said belt being entrained about a sprocket adjacent the rear end of the passageway, said sprocket being mounted above its supporting structure, the improvement wherein said sprocket is self-cleaning and comprises a body of material having a base portion generally cylindrical about the rotational axis of said sprocket and a plurality of ribs extending axially upwardly from said base portion, said ribs converging radially from the outer periphery of said base portion to a hub portion and defining with said base portion a plurality of lug receiving pockets, said pockets opening upwardly to the axial end of the sprocket, the bottom face of said pockets comprising said base portion sloping upwardly from the outer periphery to said hub portion and said hub portion sloping radially inwardly from said base portion toward the open axial ends of said pockets, the intersections in said pockets between said base portion and said hub portion being filletted such that upon said belt lugs entering said pockets, the flow of debris from said base portion onto said hub portion is facilitated.

16. The invention in accordance with claim 15 and the upper axial end of said sprocket being flat and without obstructions.

17. The invention in accordance with claim 16 and the upper axial end extending above the edge of the belt.

18. The invention in accordance with claim 15 and the sides of said ribs being parallel to radial planes bisecting said ribs.

19. The invention in accordance with claim 18 and said ribs extending below said base portion to define, with the bottom side of the base portion, a second set of pockets therebeneath open at their lower ends.

20. The invention in accordance with claim 15 and the angle of the bottom face of said pockets and the angle of the face of the belt lugs engaging said bottom face are substantially the same such that said belt lugs push material along said bottom face.

21. The invention in accordance with claim 20 and said pockets being larger circumferentially than said lugs and the pitch of the pockets being slightly greater than the pitch of said belt lugs along the line of engagement of the belt and sprocket periphery, such that upon said belt being operated with no crop load, said belt is driven by frictional engagement with said base portion periphery, the position of said lugs in said pockets varying, and upon said belt being loaded by crops, said belt is driven by the engagement of the ribs and the lugs.

22. In a crop gathering unit of the type having at least one crop passageway and an endless crop gathering belt and running adjacent said passageway having internal lugs, said belt being entrained about a sprocket rotatably mounted adjacent the rear end of the passageway, the improvement wherein said sprocket is self-cleaning and comprises a body of material having a base portion generally cylindrical about the rotational axis of said sprocket and a plurality of ribs extending axially from said base portion, said ribs converging radially from the outer periphery of said base portion to a hub portion and defining with said base portion a plurality of lug receiving pockets opening axially of said sprocket and of a considerable larger size than said belt lugs, the bottom face of said pockets comprising said base portion sloping axially toward said open end from said outer periphery toward said base portion such that a relatively close fit of said pocket bottom face and said belt lug is provided, and the pitch of said pockets being slightly greater than the pitch of said belt lugs along the line of engagement of the belt and sprocket such that upon said belt being operated with no crop load, said belt is driven by frictional engagement with said base portion periphery and upon said belt being loaded by crops said belt is driven by the engagement of the ribs and lugs.

23. The invention in accordance with claim 22 and a second set of pockets of the same configuration extending in the opposite direction from said base portion, said belt having a pair of longitudinally spaced rows of lugs, said base portion relatively closely fitting between said rows of lugs.

* * * * *